E. F. W. ALEXANDERSON.
MOTOR CONTROL SYSTEM.
APPLICATION FILED APR. 1, 1916.
1,280,624.
Patented Oct. 8, 1918.
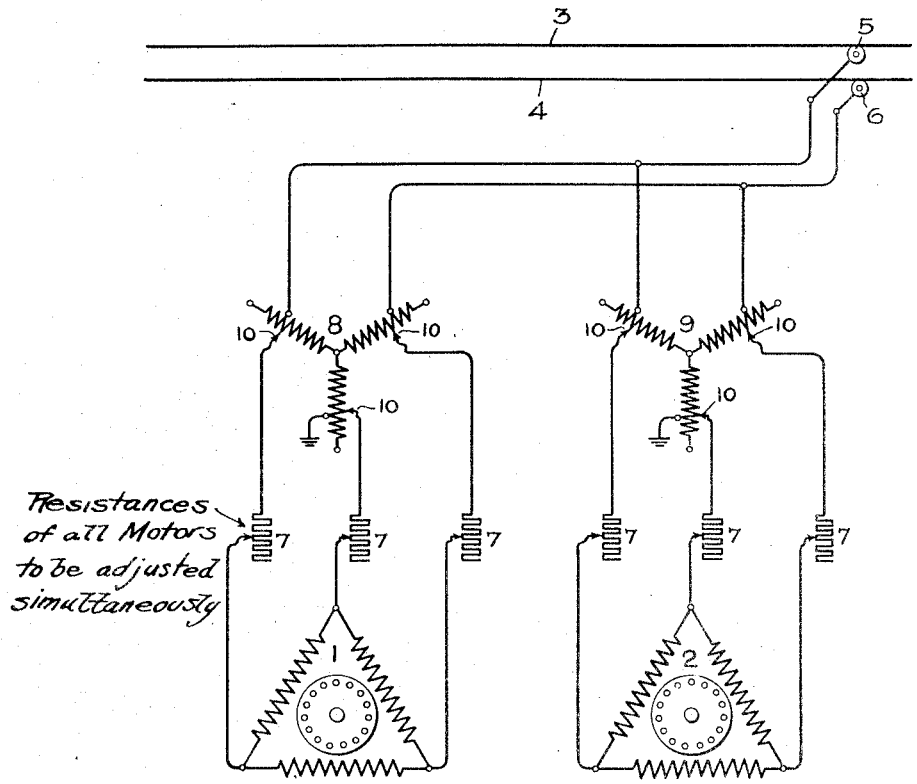
Resistances of all Motors to be adjusted simultaneously
Inventor:
Ernst F. W. Alexanderson,
by
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

MOTOR-CONTROL SYSTEM.

1,280,624.     Specification of Letters Patent.     Patented Oct. 8, 1918.

Application filed April 1, 1916. Serial No. 88,272.

*To all whom it may concern:*

Be it known that I, ERNST F. W. ALEXANDERSON, a citizen of the United States, residing at Schenectady, county of Schenectady, State of New York, have invented certain new and useful Improvements in Motor-Control Systems, of which the following is a specification.

My present invention relates to the operation of induction motors used for propelling railway vehicles and more especially to the parallel operation of a plurality of such motors.

An induction motor operates at a speed somewhat less than synchronism, there being a small amount of slip even when the motor is not carrying any load. This slip varies with the load, the greater the load carried by the motor the greater the slip becomes. Conversely, the greater the slip the greater the load which will be carried by the motor. Consequently if the two sets of driving wheels of a railway vehicle are of unequal size, as may frequently be the case, due to unequal wear, or if two cars or locomotives with wheels of different size are coupled together in a train there may be an unequal distribution of the load between the different motors because of the above-mentioned characteristic. That is, the motors driving the wheels of greater diameter will have a greater slip than those driving the wheels of smaller diameter and will take a greater portion of the total load.

The object of my invention is to overcome this disadvantage and provide means for maintaining an equal distribution of the load on the several motors under normal operating conditions.

The slip of an induction motor with any given load also varies inversely as the square of the voltage or at a somewhat higher rate due to the reactance of the windings and by taking advantage of this characteristic I am able to secure the desired results. In carrying my invention into effect I provide an individual transformer for supplying current to each motor. I also provide suitable taps on each transformer whereby the maximum voltage applied to any motor may be adjusted independently of the voltage applied to the other motors. By proper adjustment of the voltage applied to the motor or motors having the greater slip so that it is lower than the voltage applied to the motor or motors having the smaller slip, it is possible to vary the relative speed-torque characteristics so that the load will be uniformly distributed among the several motors.

My invention will best be understood by reference to the following description taken in connection with the accompanying drawing in which I have illustrated diagrammatically one set of circuit connections whereby my invention may be carried into effect. As indicated in the drawing two three-phase squirrel cage induction motors 1 and 2 are supplied with current from conductors 3 and 4 by means of the trolley 5 and 6, the ground serving as the third conductor of the distribution system. The speed control of the motors may be effected in any desired way. For purposes of illustration I have shown resistances 7 in series with the motor windings which may be varied by means of any convenient form of control apparatus which is adapted to act upon all of the resistances simultaneously. Transformers, which in the present case I have shown as auto transformers, 8 and 9, supply current for the operation of motors 1 and 2 respectively, adjustable connections being provided for connecting each supply conductor to the transformer.

If motors 1 and 2 have the same characteristics, are coupled to driving wheels of the same diameter, and are supplied with equal voltages the load will be divided equally between them. If, however, the driving wheels connected to motor 2 are of greater diameter than those connected to motor 1, motor 2 will necessarily operate with a greater slip and will carry more than half of the load. By varying the connections 10 which supply current to motor 1 so that the voltage applied thereto is greater than that applied to motor 2 this difficulty may be overcome and motor 1 may be made to take its share of the load.

It will be apparent that by this arrangement it will be possible to operate in multiple any two or more cars or locomotives of a railway system, the wheels of which differ considerably in diameter, if a uniform voltage adjustment is given to all motors driving new wheels of full diameter and every time that a wheel is turned down the voltage of the motor connected thereto is adjusted so that the motor will carry its full share of the load when running in parallel with a motor connected to full size wheels.

While I have illustrated and described only one way of carrying my invention into effect, it will be apparent that many modifications therein may be made without departing from the scope of the appended claims. By the term "vehicle" as used in the claims I mean to include either a single vehicle or a plurality of vehicles coupled together.

What I claim as new and desire to secure by Letters Patent of the United States, is:

1. The combination with a plurality of induction motors adapted to be operated in parallel for driving the wheels of a vehicle, of means adapted to simultaneously control the speeds of said motors and independent adjustable transformers for supplying current to the stator windings of each motor.

2. The combination with a plurality of squirrel cage induction motors adapted to be operated in parallel for driving the wheels of a vehicle, of adjustable resistances in series with the stator windings of said motors for simultaneously varying the speeds of said motors, independent transformers for supplying current to the stator windings of each motor and means for adjusting the relative voltages supplied by said transformers to the stator windings to vary the relative speed torque characteristics of said motors.

In witness whereof, I have hereunto set my hand this 31st day of March, 1916.

ERNST F. W. ALEXANDERSON.